(12) United States Patent
Hooli et al.

(10) Patent No.: US 9,203,585 B2
(45) Date of Patent: Dec. 1, 2015

(54) UPLINK CONTROL INFORMATION TRANSMISSION

(75) Inventors: Kari Juhani Hooli, Oulu (FI); Timo Erkki Lunttila, Espoo (FI); Kari Pekka Pajukoski, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 618 days.

(21) Appl. No.: 13/520,669

(22) PCT Filed: Jan. 8, 2010

(86) PCT No.: PCT/EP2010/050149
§ 371 (c)(1),
(2), (4) Date: Oct. 5, 2012

(87) PCT Pub. No.: WO2011/082828
PCT Pub. Date: Jul. 14, 2011

(65) Prior Publication Data
US 2013/0028203 A1    Jan. 31, 2013

(51) Int. Cl.
*H04W 72/08* (2009.01)
*H04W 72/06* (2009.01)
*H04W 72/04* (2009.01)
(Continued)

(52) U.S. Cl.
CPC .......... *H04L 5/0053* (2013.01); *H04L 1/0026* (2013.01); *H04L 1/0031* (2013.01); *H04L 1/0003* (2013.01); *H04L 1/0009* (2013.01);
(Continued)

(58) Field of Classification Search
CPC ... H04L 1/0003; H04L 1/0009; H04L 1/0026; H04L 1/1607; H04L 5/0007; H04L 5/0053; H04L 1/0031; H04W 28/26

USPC .......................................................... 370/329
See application file for complete search history.

(56) References Cited

U.S. PATENT DOCUMENTS

2010/0254331 A1* 10/2010 Kim et al. ..................... 370/329

FOREIGN PATENT DOCUMENTS

EP        2 086 153 A2     8/2009
JP        2006/080920 A    3/2006
(Continued)

OTHER PUBLICATIONS

LG Electronics, "Multiplexing of Control and Data in PUSCH", R1-081005, 3GPP TSG RAN WG1#52, Sorrento, Italy, Feb. 11-15, 2008, pp. 1-17.*

(Continued)

*Primary Examiner* — Jung Park
*Assistant Examiner* — Albert Shih
(74) *Attorney, Agent, or Firm* — Harrington & Smith

(57) ABSTRACT

An apparatus includes at least one processor and at least one memory including a computer program code, the at least one memory and the computer program code configured, with the at least one processor, to cause the apparatus at least to: reserve at least an equal number of modulation symbols for uplink control information symbols in each physical uplink shared channel transport block; create at least one layer-specific replica of the uplink control information symbols to be placed in some of reserved resources of the physical uplink shared channel transport blocks; and scramble uplink control information symbols including the symbols of the at least one layer-specific replica in a layer-specific manner for multiplexing the uplink control information with physical uplink shared channel data.

29 Claims, 5 Drawing Sheets

Figure 1:
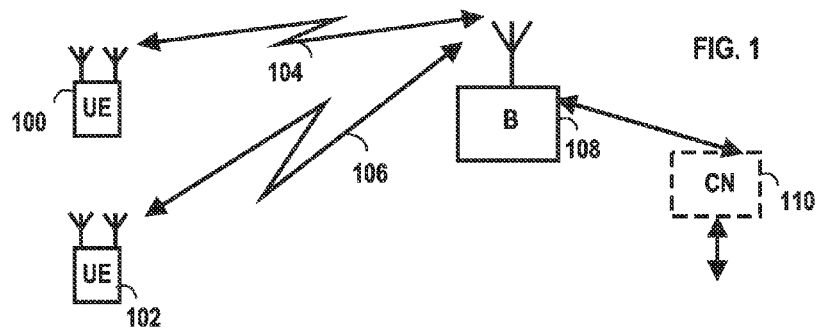

(51) Int. Cl.
  *H04L 5/00* (2006.01)
  *H04L 1/00* (2006.01)
  *H04L 1/16* (2006.01)
  *H04W 28/26* (2009.01)

(52) U.S. Cl.
  CPC ............ *H04L1/1607* (2013.01); *H04L 5/0007* (2013.01); *H04W 28/26* (2013.01)

(56) References Cited

FOREIGN PATENT DOCUMENTS

| JP | 2007/019799 A | 1/2007 |
|----|---------------|--------|
| JP | 2012/514361 A | 6/2012 |
| JP | 2012/531114 A | 12/2012 |
| JP | 2013/505622 A | 2/2013 |
| WO | WO 2009/061122 A2 | 5/2009 |

OTHER PUBLICATIONS

3GPP TS 36.211 V8.9.0 (Dec. 2009), "3$^{rd}$ Generation Partnership Project; Technical specification Group Radio Access Network; Evolved Universal Terrestrial Radio Access (E-UTRA); Physical channels and Modulation (Release 8)", 83 pgs.

3GPP TS 36.212 V8.8.0 (Dec. 2009), "3$^{rd}$ Generation Partnership Project; Technical Specification Group Radio Access Network; Evolved Universal Terrestrial Radio Access (E-UTRA); Multiplexing and channel coding (Release 8)", 60 pgs.

3GPP TS 36.212 V9.0.0. (Dec. 2009), "3$^{rd}$ Generation Partnership Project; Technical Specification Group Radio Access Network; Evolved Universal Terrestrial Radio Access (E-UTRA); Multiplexing and channel coding (Release 9)", 61 pgs.

R1-081005, 3GPP TSG RAN WG1#52, Sorrento, Italy, Feb. 11-15, 2008, "Multiplexing of Control and Data in PUSCH", LG Electronics, 17 pgs.

3GPP TSG RAN 1#57bis; R1-092644; Motorola; "Multi-Antenna Support in UL PUSCH/PUCCH/PRACH/SRS Transmission"; Los Angeles, USA Jun. 29—Jul. 3, 2009 (5 pages).

3GPP TSG RAN WG1 Meeting #60bis; R1-101905; Nokia Siemens Networks, Nokia; "UCI transmission on PUSCH with SU-MIMO"; Beijing, P.R. China, Apr. 12-16, 2010 (2 pages).

* cited by examiner

UPLINK CONTROL INFORMATION TRANSMISSION

FIELD

The invention relates to an apparatus, method, computer program and a computer program distribution medium for uplink control information transmission.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of communications technologies, launching of different services attainable wirelessly, generally speaking a requirement for increased data rates, has lead to need to develop also the communication standards. One of the standards providing higher data rates is 3GPP long-term evolution (LTE) and 3GPP long-term evolution advanced (LTE-A).

One target of the development of the LTE-A standard is to reach requirements defined in International Mobile telecommunications Advanced (IMT-A).

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: reserve at least substantially equal number of modulation symbols for uplink control information symbols in each physical uplink shared channel transport block; create at least one layer-specific replica of the uplink control information symbols to be placed in some of reserved resources of the physical uplink shared channel transport blocks; and scramble uplink control information symbols including the symbols of the at least one layer-specific replica in a layer-specific manner for multiplexing the uplink control information with physical uplink shared channel data.

According to another aspect of the present invention, there is provided a method reserving at least substantially equal number of modulation symbols for uplink control information symbols in each physical uplink shared channel transport block; creating at least one layer-specific replica of the uplink control in-formation symbols to be placed in some of reserved resources of the physical uplink shared channel transport blocks; and scrambling uplink control information symbols including the symbols of the at least one layer-specific replica in a layer-specific manner for multiplexing the uplink control information with physical uplink shared channel data.

According to yet another aspect of the present invention, there is provided an apparatus, comprising: means for reserving at least substantially equal number of modulation symbols for uplink control information symbols in each physical uplink shared channel transport block; means for creating at least one layer-specific replica of the uplink control information symbols to be placed in some of reserved resources of the physical uplink shared channel transport blocks; and means for scrambling uplink control information symbols including the symbols of the at least one layer-specific replica in a layer-specific manner for multiplexing the uplink control information with physical uplink shared channel data.

According to yet another aspect of the present invention, there is provided a computer program product, embodied on a computer-readable medium, the computer program being configured to control a processor to perform: reserving at least substantially equal number of modulation symbols for uplink control information symbols in each physical uplink shared channel transport block; creating at least one layer-specific replica of the uplink control in-formation symbols to be placed in some of reserved resources of the physical uplink shared channel transport blocks; and scrambling uplink control information symbols including the symbols of the at least one layer-specific replica in a layer-specific manner for multiplexing the uplink control information with physical uplink shared channel data.

LIST OF THE DRAWINGS

Figure 2:
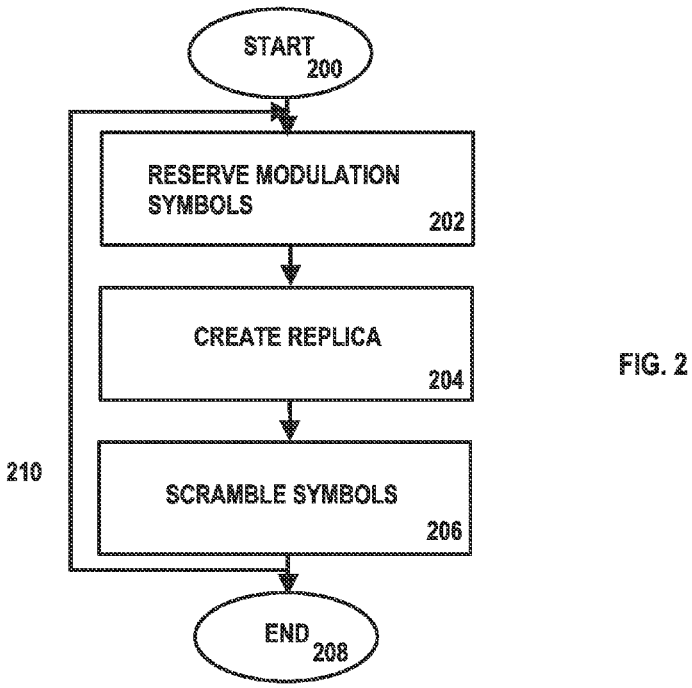
Figure 8:
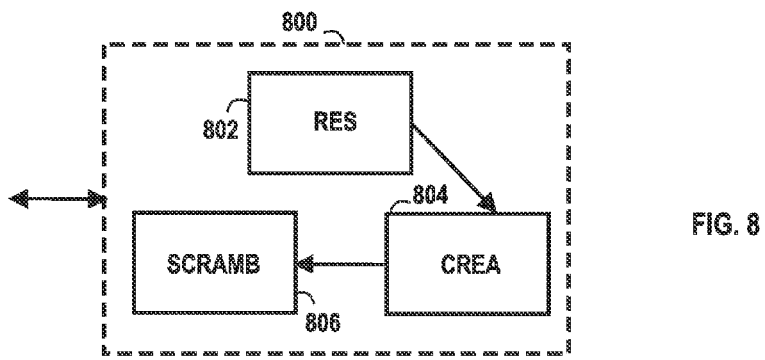
Figure 3:
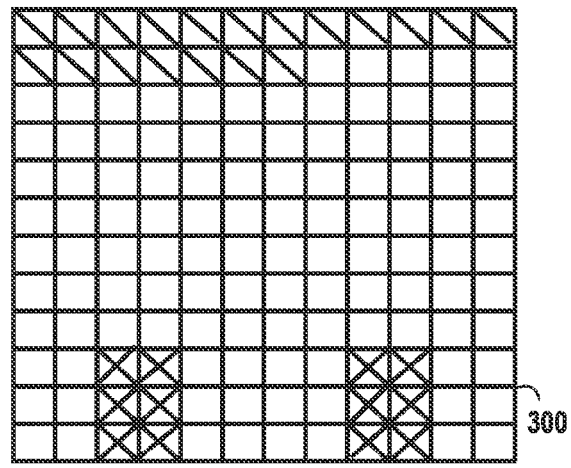
Figure 4:
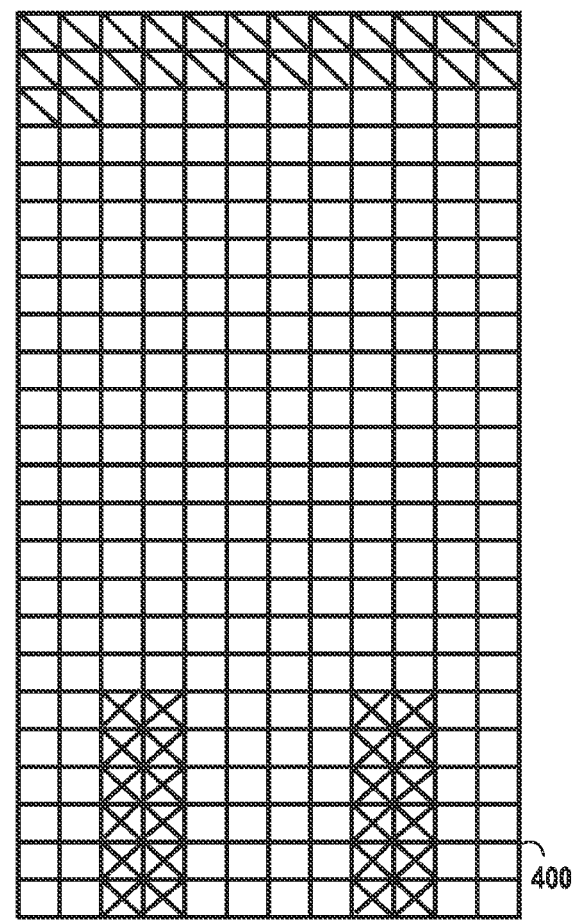
Figure 5:
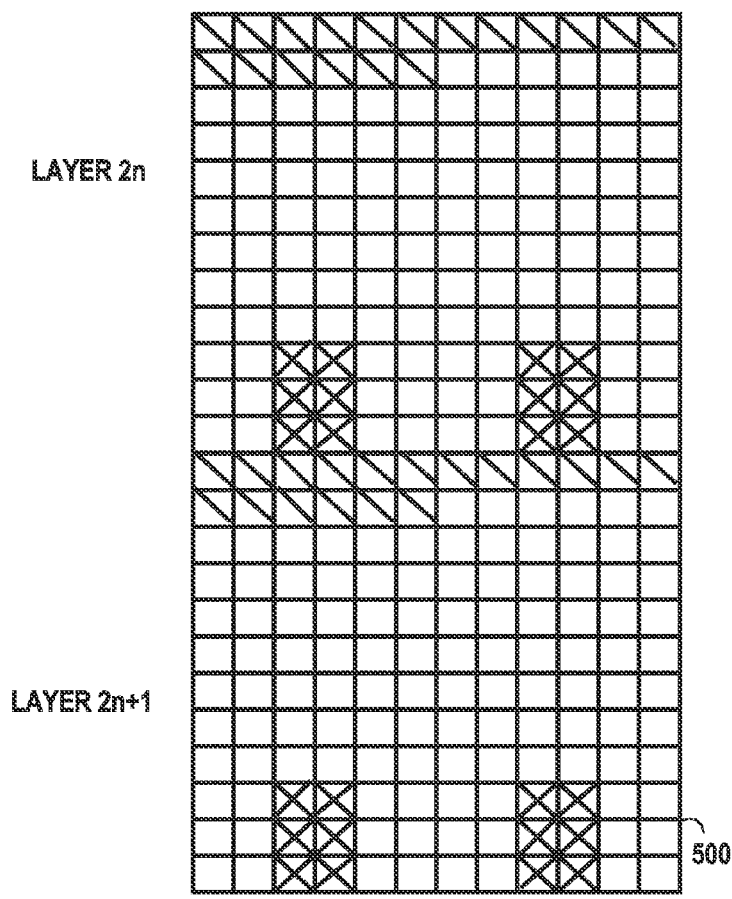
Figure 6:
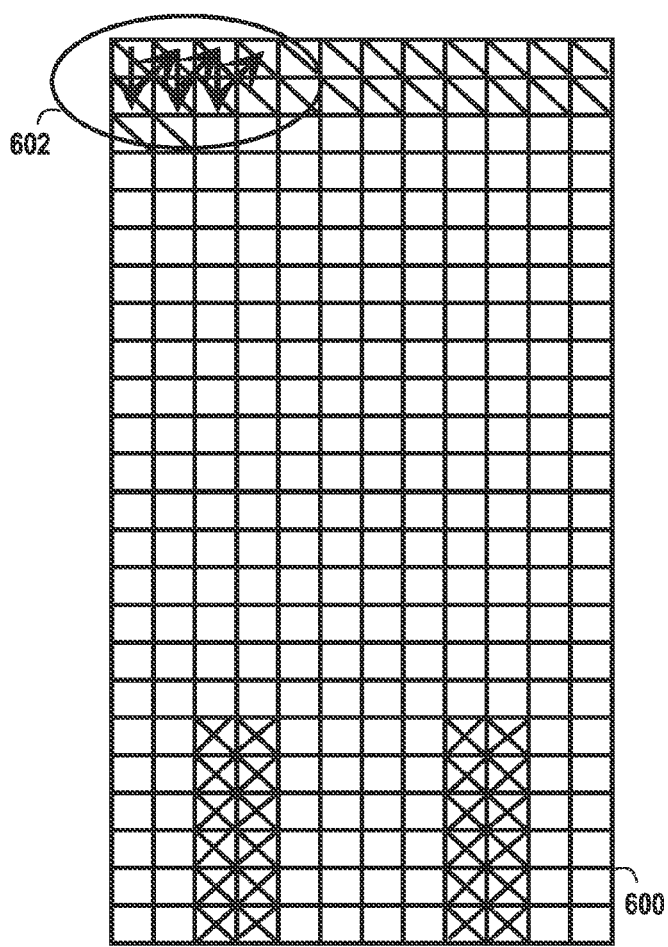
Figure 7:
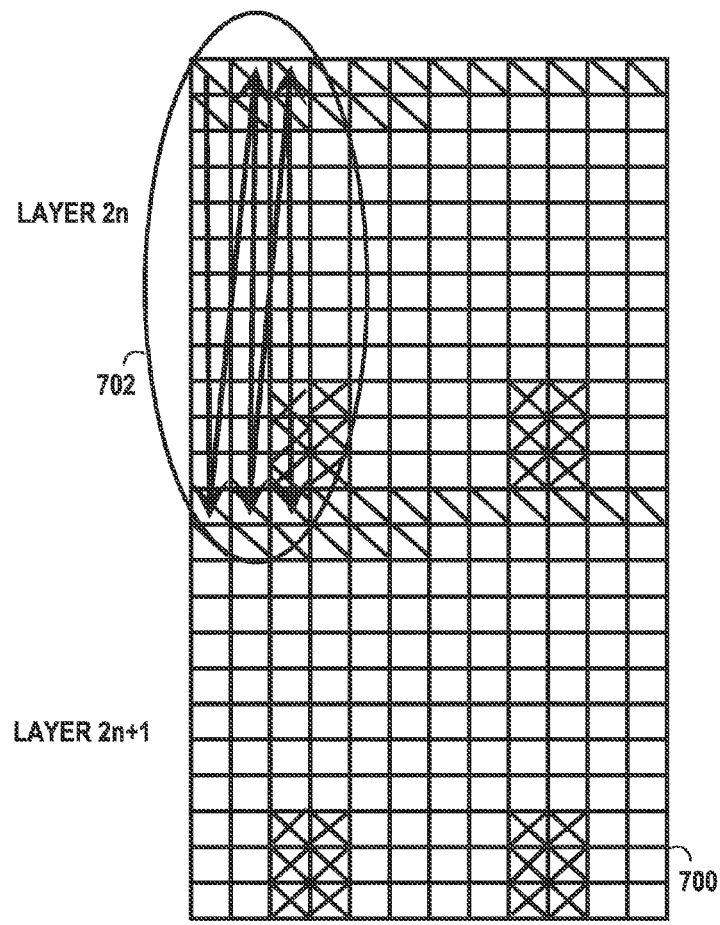

In the following the invention will be described in greater detail by means of preferred embodiments with reference to the attached [accompanying] drawings, in which FIG. 1 is shows an example of a system;
FIG. 2 is a flow chart;
FIG. 3 is an example of an interleaving matrix;
FIG. 4 is another example of an interleaving matrix;
FIG. 5 is yet another example of an interleaving matrix;
FIG. 6 is yet another example of an interleaving matrix;
FIG. 7 is yet another example of an interleaving matrix; and
FIG. 8 is an example of an apparatus.

DESCRIPTION OF SOME EMBODIMENTS

The following embodiments to be described are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. The embodiments will be described with reference to the accompanying drawings, in which some, but not all embodiments of the invention are shown. Indeed, the invention may be embodied in many different forms and should not be construed as limited to the embodiments set forth herein.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of an access architecture to which the embodiments may be applied, a radio access architecture based on LTE Advanced, LTE-A, that is based on orthogonal frequency multiplexed access (OFDMA) in a downlink and a single-carrier frequency-division multiple access (SC-FDMA) in an uplink, without restricting the embodiments to such an architecture, however.

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a NodeB needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the NodeB.

FIG. 1 is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with the necessary properties.

FIG. 1 shows a part of a radio access network of E-UTRA, LTE or LTE-A. E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104, 106 in a cell with a NodeB 108 providing the cell. The physical link from a user device to a NodeB is called uplink or reverse link and the physical link from the NodeB to the user device is called downlink or forward link.

The NodeB, or advanced evolved node B (eNodeB), is a computing device configured to control the radio resources of communication system it is coupled to. The NodeB may also be referred to a base station, an access point or any other type of interfacing device including a relay station capable of operating in a wireless environment.

The NodeB includes transceivers, for instance. From the transceivers of the NodeB, a connection is provided to an antenna unit that establishes bi-directional radio links to the user devices. The NodeB is further connected to a core network 110 (CN). Depending on the system, the counterpart on the CN side can be a serving system architecture evolution (SAE) gateway (routing and forwarding user data packets), packet data network gateway (PDN GW), for providing connectivity to user devices (UEs) to external packet data networks, or mobile management entity (MME), etc.

The communication system is also able to communicate with other networks, such as a public switched telephone network or the Internet.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

The user device (or a layer 3 relay node) is configured to perform one or more of user equipment functionalities described below with an embodiment, and it may be configured to perform functionalities from different embodiments. The user device may also be called a subscriber unit, mobile station, remote terminal, access terminal, user terminal or user equipment (UE) just to mention but a few names or apparatuses.

It should be understood that, in the FIG. 1, user devices are depicted to include 2 antennas only for the sake of clarity. The number of reception and/or transmission antennas may naturally vary according to a current implementation.

It is obvious for a person skilled in the art that the depicted system is only an example of a part of a radio access system and in practise, the system may comprise a plurality of NodeBs, the user device may have an access to a plurality of radio cells and the system may comprise also other apparatuses, such as physical layer relay nodes or other network elements.

Further, although the apparatuses have been depicted as single entities, different units, processors and/or memory units (not all shown in FIG. 1) may be implemented.

The LTE and LTE-A systems utilize various MIMO technologies including transmission diversity, single user (SU)-MIMO, multiuser (MU)-MIMO, closed-loop precoding, and dedicated beamforming.

The SU-MIMO scheme is applied to the physical downlink shared channel (PDSCH). There are two operation modes in SU-MIMO spatial multiplexing: the closed-loop spatial multiplexing mode and the open-loop spatial multiplexing mode.

In the LTE-A systems, the SU-MIMO scheme is also applied to a physical uplink shared channel (PUSCH) for user devices having more than one transmission antennas. At least two operation modes for SU-MIMO user devices are provided: a closed-loop spatial multiplexing mode and single antenna port mode.

MIMO indicates the use of multiple antennas at both the transmitter and receiver ends to improve communication performance (higher throughput, greater capacity, or improved reliability, or any combination thereof). It is usually classified into forms of smart antenna technology. MIMO systems can be divided in two classes: single-user MIMO, and multi-user MIMO. One target of the single-user MIMO (SU-MIMO) operation is typically to increase peak data rate per user device, whereas in multi-user MIMO (MU-MIMO), one target is typically to increase sector (or cell) capacity. MIMO exploits spatial multiplexing to provide increased throughput and reliability, MU-MIMO exploits multi-user multiplexing (or multi-user diversity) to further gains in capacity. Additionally, MU-MIMO benefits from spatial multiplexing even when user equipment has a single reception/transmission antenna.

In the closed-loop spatial multiplexing mode, the NodeB applies spatial domain precoding to a transmitted signal on the basis of a precoding matrix indicator (PMI) signalled for a user device. To support the closed-loop spatial multiplexing in the downlink, the user device signals as a feedback a rank indicator (RI), a PMI, and a channel quality indicator (CQI) in the uplink. The RI indicates the number of spatial layers that can be supported. The NodeB may decide the transmission rank (number of spatial layers) taking into account the RI as well as other factors such as traffic pattern, available transmission power, etc. The CQI feedback indicates a combination of modulation scheme and a channel coding rate.

In the following, an embodiment of a method is explained by means of FIG. 2.

In LTE release 8, uplink layer 1/layer 2 (L1/L2) control signalling is divided into two classes: control signalling in the absence of uplink data that takes place on a physical uplink control channel (PUCCH) and control signalling in the presence of uplink data that takes place on a physical uplink shared channel (PUSCH). It should be paid attention to the fact that, in LTE release 8, simultaneous transmission of PUCCH and PUSCH channels is not allowed due to single carrier limitations. However, in the LTE release 10, this limitation will be relaxed and simultaneous transmission of PUCCH and PUSCH will be possible.

The embodiment is suitable for uplink control information (UCI) transmission in the presence of uplink (UL) data. In order to maintain single carrier properties and/or low cubic metric properties of a transmitted signal, data and control symbols are multiplexed prior to the discrete Fourier transformation (DFT) by means of time division multiplexing (TDM). Data transmitted on a PUSCH channel is punctured by the number of control symbols allocated in a subframe. Data and control symbols are coded and modulated separately before they are multiplexed into a same SC-FDMA symbol block. Control symbols may carry a plurality of different information, such as an acknowledge character (ACK)/negative acknowledge character (NACK), channel quality indicator (CQI), precoding matrix indicator (PMI) and rank indicator (RI). Different coding rates for control purposes are achieved by occupying different number of symbols for each control symbol field in a message.

In the LTE-A uplink single-user spatial multiplexing, up to 2 transport blocks may be transmitted from a user device in one subframe per an uplink component carrier. Each transport block has a modulation and coding scheme (MCS) level of its own. Depending on the number of transmission layers, modulation symbols associated with each of the transport blocks are mapped onto one or 2 layers according to a similar principle as in release 8 E-UTRA downlink spatial multiplexing.

In LTE-A, the introduction of uplink SU-MIMO spatial multiplexing sets new requirements for uplink control information transmission on a PUSCH.

In the embodiment, uplink control information (UCI) is multiplexed with PUSCH data in a layer-specific manner prior to the discrete Fourier transform by means of time division multiplexing in such a way that a reliable rank 1 transmission of the uplink control information is achievable regardless of the transmission rank and precoding of the PUSCH data.

The embodiment starts in block 200.

In block 202, at least substantially equal number of modulation symbols is reserved for uplink control information symbols in each physical uplink shared channel transport block.

In the case of two transport blocks, the number of symbols could be derived based on a first or second transport block or a transport block with higher or lower modulation coding scheme, for instance. Another option is to derive the number of coded symbols on the basis of the average number of bits per a transport block.

That is to say, resources are jointly dimensioned for transmission blocks, the typical number of which is 2.

At least substantially equal number of modulation symbols is typically reserved regardless of the modulation used for the transport block. For example, in the case of rank 3, transport block 2 of the total number of 2 has even number of uplink control symbols and in the case of rank 4, both of 2 transport blocks have even number of uplink control symbols.

In block 204, at least one layer-specific replica of the uplink control information symbols is created to be placed in some of reserved resources of the physical uplink shared channel transport blocks.

The uplink control information symbols may include a plurality of control information, such as ACK/NACK, RI, CQI, etc.

Practically speaking, creating at least one replica means that the same UCI is in all transport blocks, the typical number of which is 2. For example, in the case of rank 3, the uplink control information is further replicated within transport block 2 to obtain a layer-specific replica and in the case of rank 4, the uplink control information is further replicated within both transport blocks to obtain a layer specific replica.

In block 206, the uplink control information symbols including the symbols of the at least one layer-specific replica are scrambled in a layer-specific manner for multiplexing the uplink control information with physical uplink shared channel data.

The layer-specific scrambling is usually implemented by using phase rotation. It improves the reliability of rank 1 UCI transmission. The layer-specific scrambling typically fulfils: a scrambling sequence is specified and known to both ends, a user device and eNodeB, the scrambling sequence may be the same or different for different UCI fields, the scrambling may be applied either in a bit domain or in a modulated symbol domain, and/or the scrambling sequence may be limited into a predetermined modulation constellations, such as a binary phase-shift keying (BPSK) or quadrature phase shift keying (QPSK).

The layer-specific scrambling may be carried out prior to modulation and layer mapping by using a transport block-specific pseudo-random scrambling code.

It should be understood that the direct application of LTE release 8 scrambling together with transport block-specific scrambling code initialization as in LTE release 8 for the downlink, provides scrambling sequences that are suitable for the layer-specific scrambling described above.

In another embodiment, also optimised layer-specific scrambling sequences may be used.

In yet another embodiment, also the same scrambling sequence for each layer may be used in order to make single stream precoding possible for UCI.

In yet another embodiment, the proposed scheme is limited to some of the UCI fields, whereas some other UCI fields may apply spatial multiplexing according to the transmission rank of a PUSCH. For instance, the system may apply the spatial multiplexing to an aperiodic channel quality indicator, whereas the system may apply the scheme according to the embodiment to periodic channel quality indicator, rank indicator and ACK/NACK.

In the following, an example of a possible implementation of the embodiment is explained. The example is based on LTE release 8 36.211 and 36.212 standards. Naturally, the following is only a clarifying example and it does not limit the applicability of the invention. In the following, uplink control information used as examples are ACK/NACK and RI.

As an example for block 202:

In an embodiment, the number of coded symbols for ACK/NACK and RI is given as:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{t=0}^{T-1} \sum_{r=0}^{C(t)-1} K_r(t)/T} \right\rceil, 4 \cdot M_{sc}^{PUSCH}\right), \quad (1)$$

Wherein min denotes a minimum,

O denotes the number of ACK/NACK or RI bits, $M_{sc}^{PUSCH-initial}$ denotes the scheduled bandwidth for a PUSCH transmission in the sub-frame for an initial PUSCH transmission for a transport block that is expressed in the number of subcarriers, $N_{symb}^{PUSCH-initial}$ denotes the number of SC-FDMA symbols per a subframe for an initial PUSCH transmission, $\beta_{offset}^{PUSCH}$ denotes the offset parameter signalled to a user device via higher layers, T denotes the number transport blocks to be multiplexed, C(t) denotes the number of code blocks, t denotes the number of a transport block, r denotes a code block number, $K_r(t)$ denotes the number of bits per a code block, $M_{sc}^{PUSCH}$ denotes a scheduled bandwidth for a PUSCH transmission in a current sub-frame for a transport block that is expressed in the number of subcarriers, · denotes multiplication, and □ denotes a summing operation.

In this embodiment, as can be seen, the average number of bits per a transport block is used in the calculation of coded symbols.

It should be appreciated that $\beta_{offset}^{PUSCH}$ may be rank-specific, transport block-specific or UCI-field-specific. That is to say, rank-specific or transport block-specific $\beta_{offset}^{PUSCH}$ values may be signalled at a higher layer for each type of uplink control information.

Similar calculation may also be used for deriving the number of coded symbols.

As an example for block 204:

The at least one layer-specific replicas or copies may be created in 2 steps:

first, same uplink control information (bits) is inserted into the corresponding channel coding in all transport blocks. It should be understood that due to transport block specific modulation and coding scheme (MCS), channel coding may be different in different transport blocks. Second, in the case of rank 3 or rank 4, one or all of transport blocks (typically 2) are mapped onto 2 layers, in which case, coded UCI bits are replicated and inserted into the channel interleaving matrix 400 or 500 as shown in FIG. 4 or 5. FIG. 3 shows an example of the placement of coded UCI symbols in the channel interleaving matrix 300, when rank is 1 or 2.

In FIGS. 3, 4, 5, 6, 7 and 8, each squared element contains modulation symbols or, alternatively, a column vector including a predetermined number of bits. The number of elements is determined according to the applied standard. For example, the number of rows corresponds to the size of discrete Fourier transform or its multiplication (in FIGS. 4 and 5: 2DFT, as well as in FIGS. 6, 7 and 8), and the number of columns corresponds to the number of SC-FDMA symbols in a PUSCH transmission sub-frame. In the Figures, CQI symbols are marked with a line crossing the element from one corner to another, ACK/NACK symbols are marked with a cross, and the rest are RI symbols.

FIG. 4 shows an example of the placement of coded UCI symbols in the channel interleaving matrix 400 when a transport block is mapped into 2 layers. Scrambling sequences shown in FIG. 4 are for symbol-level scrambling, but, instead, a corresponding bit-level scrambling may easily be obtained. In the Figure, symbols for different layers alternate in a row-wise manner, for example on a first row are provided symbols of layer 2n and in the second row symbols of layer 2n+1, then again symbols of layer 2n, etc. ACK/NACK and/or RI symbols are repeated for 2 layers.

FIG. 5 shows another example of the placement of coded UCI symbols in the channel interleaving matrix 500, when a transport block is mapped into 2 layers. In this option, coded bits of a single code block are not transmitted simultaneously on multiple layers. In the Figure, ACK/NACK and/or RI symbols are repeated for 2 layers, in such a manner that the 2 layers are similarly mapped.

As an example for block 206:

Alternatively to pseudo-random scrambling, also optimised layer-specific scrambling sequences may be used. An example of such sequences is shown in table 1. These sequences may be used for scrambling of uplink control information symbols. The sequences have been chosen on the basis of the following criteria: first, QPSK alphabet is used. Second, a relative phase difference between 2 layers goes through QPSK constellation within 4 consecutive symbols for following layer pairs: 1 and 2, 2 and 3, 3 and 4, and 1 and 4. For layer pairs 1 and 3, and 2 and 4, the phase difference goes through at least BPSK constellation within 4 consecutive symbols. For achieving adequate transmission diversity between layers for all ranks, the following procedures may be followed: for rank 2, since only 2 layers are available, it is beneficial to go through all 4 phase differences within cycles of 4 symbols. For rank 3, sequences go through all 4 phase differences within cycles of 4 symbols for layer pairs 1 and 2, and 2 and 3. Layer pair 1 and 3 has smaller phase rotations. On the other hand, in precoding codebooks for rank 3 in 3GPP, layer 1 is mapped on 4 or 2 transmission antennas, whereas both layers 2 and 3 are mapped on 2 or 1 transmission antennas. For rank 4, no actual precoding is available. In the case of uniform linear array (ULA) antennas, consecutive layers are expected to be mapped on neighbouring antenna elements. This means that spatial correlation is as its highest between layer pairs 1 and 2, 2 and 3, and 3 and 4, and it is beneficial to go through all 4 phase differences within cycles of 4 symbols between these layer pairs. Third, a nester property, that is a scrambling sequence for instance for layer 2 is same for transmission ranks 2, 3 and 4.

TABLE 1

| | Rank 2 | | | |
| --- | --- | --- | --- | --- |
| | Symbol number | | | |
| | 1 | 2 | 3 | 4 |
| Layer 1 | 1 | 1 | 1 | 1 |
| Layer 2 | 1 | j | −1 | −j |

TABLE 1-continued

Rank 3

| | Sym No | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Layer 1 | 1 | 1 | 1 | 1 | 1 | 1 | 1 | 1 | 1 | 1 | 1 | 1 | 1 | 1 | 1 | 1 |
| Layer 2 | 1 | j | −1 | −j | 1 | j | −1 | −j | 1 | j | −1 | −j | 1 | j | −1 | −j |
| Layer 3 | 1 | −1 | 1 | −1 | j | −j | j | −j | −1 | 1 | −1 | 1 | −j | j | −j | j |

Rank 4

| | Sym No | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Layer 1 | 1 | 1 | 1 | 1 | 1 | 1 | 1 | 1 | 1 | 1 | 1 | 1 | 1 | 1 | 1 | 1 |
| Layer 2 | 1 | j | −1 | −j | 1 | j | −1 | −j | 1 | j | −1 | −j | 1 | j | −1 | −j |
| Layer 3 | 1 | −1 | 1 | −1 | j | −j | j | −j | −1 | 1 | −1 | 1 | −j | j | −j | j |
| Layer 4 | 1 | −j | −1 | j | j | 1 | −j | −1 | −1 | j | 1 | −j | −j | −1 | j | 1 |

| | Sym No | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Layer 1 | 1 | 1 | 1 | 1 | 1 | 1 | 1 | 1 | 1 | 1 | 1 | 1 | 1 | 1 | 1 | 1 |
| Layer 2 | 1 | j | −1 | −j | 1 | j | −1 | −j | 1 | j | −1 | −j | 1 | j | −1 | −j |
| Layer 3 | 1 | −1 | 1 | −1 | j | −j | j | −j | −1 | 1 | −1 | 1 | −j | j | −j | j |
| Layer 4 | 1 | −j | −1 | j | j | 1 | −j | −1 | −1 | j | 1 | −j | −j | −1 | −1 | j |

| | Sym No | | | | | | | | | | | | | | | |
|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 |
| Layer 1 | 1 | 1 | 1 | 1 | 1 | 1 | 1 | 1 | 1 | 1 | 1 | 1 | 1 | 1 | 1 | 1 |
| Layer 2 | 1 | j | −1 | −j | 1 | j | −1 | −j | 1 | j | −1 | −j | 1 | j | −1 | −j |
| Layer 3 | 1 | −1 | 1 | −1 | j | −j | j | −j | −1 | 1 | −1 | 1 | −j | j | −j | j |
| Layer 4 | −1 | j | 1 | −j | −j | −1 | j | 1 | 1 | −j | −1 | j | j | 1 | −j | −1 |

| | Sym No | | | | | | | | | | | | | | | |
|---|---|---|---|---|---|---|---|---|---|---|---|---|---|---|---|---|
| | 49 | 50 | 51 | 52 | 53 | 54 | 55 | 56 | 57 | 58 | 59 | 60 | 61 | 62 | 63 | 64 |
| Layer 1 | 1 | 1 | 1 | 1 | 1 | 1 | 1 | 1 | 1 | 1 | 1 | 1 | 1 | 1 | 1 | 1 |
| Layer 2 | 1 | j | −1 | −j | 1 | j | −1 | −j | 1 | j | −1 | −j | 1 | j | −1 | −j |
| Layer 3 | 1 | −1 | 1 | −1 | j | −j | j | −j | −1 | 1 | −1 | 1 | −j | j | −j | j |
| Layer 4 | −j | −1 | j | 1 | 1 | −j | −1 | j | j | 1 | −j | −1 | −1 | j | 1 | −j |

It should be appreciated that when more uplink control information symbols than what is the length of a scrambling sequence are available, the scrambling sequence may be repeated. Further, the LTE-A uplink may include layer shifting. If so, it should be taken into account in scrambling sequences in order that the effect of layer shifting may be removed for uplink control information symbols. Yet further, scrambling sequences used may also utilize a portion of the shown sequences and repeat them up to the length of the uplink control information symbols.

As already stated above, the usage of the rank 1 transmission scheme may be limited to some of the uplink control information fields, whereas to other fields, such as aperiodic channel quality indicator (CQI), spatial multiplexing according to transmission rank of PUSCH may be applied. In such a case, following conditions are typically fulfilled: only one channel coding block for the CQI is provided instead of replicated coding by using two channel coding blocks, and the number of coded symbols for CQI is determined jointly over the transport blocks (typically 2). For instance, the number of coded symbols for a channel quality indicator may be determined as:

$$Q' = \min\left(\left\lceil \frac{(O + L) \cdot M_{sc}^{PUSCH-initial} \cdot N_{symb}^{PUSCH-initial} \cdot \beta_{offset}^{PUSCH}}{\sum_{t=0}^{T-1} \sum_{r=0}^{C(t)-1} K_r(t)/T} \right\rceil, R \cdot M_{sc}^{PUSCH} \cdot N_{symb}^{PUSCH} - Q_{RI}^{Total}\right), \quad (2)$$

Wherein
min denotes a minimum,
O denotes the number of CQI bits,
L denotes the number of cyclic redundancy check bits,
$M_{sc}^{PUSCH-initial}$ denotes the scheduled bandwidth for a PUSCH transmission in the sub-frame for an initial PUSCH transmission for a transport block that is expressed in the number of subcarriers,
$N_{symb}^{PUSCH-initial}$ denotes the number of SC-FDMA symbols per a subframe for an initial PUSCH transmission,
$\beta_{offset}^{PUSCH} = \beta_{offset}^{CQI}$ denotes the offset parameter signalled to a user device via higher layers,
T denotes the number transport blocks to be multiplexed,
C(t) denotes the number of code blocks,
t denotes the number of a transport block, r denotes a code block number, $K_r(t)$ denotes the number of bits per a code block, R denotes a transmission rank, $M_{sc}^{PUSCH}$ denotes a scheduled bandwidth for a PUSCH transmission in a current sub-frame for a transport block that is expressed in the number of subcarriers, $N_{symb}^{PUSCH}$ denotes the number of SC-FDMA symbols per a subframe, $Q_{RI}^{Total}$ denotes the number of symbols reserved for RI obtained by using equation (1). If a rank indicator is not transmitted, $Q_{RI}^{Total}=0$, otherwise it is the number of coded RI symbols counted over all layers, · denotes multiplication, and □ denotes a summing operation.

Coded channel quality indicator bits are at least substantially equally distributed to all layers in the following manner, for example: the coded CQI bits are serial-to-parallel mapped to be multiplexed with different transport blocks. For rank 2 or rank 4, even coded CQI bits are mapped into one of the transport blocks and odd CQI bits are mapped into the rest of the transport blocks, that is $q_i^{(0)}=q_{2i}, q_i^{(1)}=q_{2i+1}$, wherein $q_x^{(y)}$ are the coded CQI bits and $q_x^{(y)}$ are the coded CQI bits which are to be multiplexed with a transport block. For rank 3, the size of transport blocks is taken into account in the mapping of CQI bits, for example $q_i^{(0)}=q_{3i}, q_{2i}^{(1)}=q_{3i+1}$ and $q_{2i+1}^{(1)}=q_{3i+2}$.

FIGS. 6 and 7 show examples of rank 3 and 4 transport block mapping, when 2 layers are provided. Coded CQI bits are inserted to an interleaving matrix 600 or 700 in such a manner that the coded CQI bits are evenly mapped on the layers. The order of the insertion is illustrated in FIGS. 7 and 8 by arrows 602 and 702. Otherwise FIG. 6 corresponds to FIG. 4 and FIG. 7 corresponds to FIG. 5.

The embodiment ends in block 208. The embodiment is repeatable in many different ways. Arrow 210 shows one example.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The signaling messages are only examples and may even comprise several separate messages for transmitting the same information. In addition, the messages may also contain other information.

An embodiment provides an apparatus which may be any user device able to carry out processes described above in relation to FIG. 2.

FIG. 8 illustrates a simplified block diagram of an apparatus according to an embodiment of the invention. It should be appreciated that the apparatus may also include other units or parts than those depicted in FIG. 8. Although the apparatus has been depicted as one entity, different modules and memory may be implemented in one or more physical or logical entities.

The apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus.

The apparatus may be a software application, or a module, or a unit configured as arithmetic operation, or as a program (including an added or updated software routine), executed by an operation processor. Programs, also called program products or computer programs, including software routines, applets and/or macros, can be stored in any apparatus-readable data storage medium and they include program instructions to perform particular tasks. Computer programs may be coded by a programming language, which may be a high-level programming language, such as C, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a user device, or a corresponding component, may be configured as a computer or a microprocessor, such as single-chip computer element, or as a chipset, including at least a memory for providing storage capacity used for arithmetic operation and an operation processor for executing the arithmetic operation.

As an example of an apparatus according to an embodiment, it is shown an apparatus 800, such as a user device or a user terminal, the apparatus comprising: at least one processor and at least one memory including a computer program code, the at least one memory and the computer program code configured to, with the at least one processor, cause the apparatus at least to: reserve (802) at least substantially equal number of modulation symbols for uplink control information symbols in each physical uplink shared channel transport block, create (804) at least one layer-specific replica of the uplink control information symbols to be placed in some of reserved resources of the physical uplink shared channel transport blocks, and scramble (806) uplink control information symbols including the symbols of the at least one layer-specific replica in a layer-specific manner for multiplexing the uplink control information with physical uplink shared channel data.

As another example of an apparatus according to an embodiment, it is shown an apparatus, such as a user device or a user terminal, including facilities in a control unit 800 (including one or more processors, for example) to carry out functions of embodiments described above.

Yet another example of the apparatus comprises means 802 for reserving at least substantially equal number of modulation symbols for uplink control information symbols in each physical uplink shared channel transport block, means 804 for creating at least one layer-specific replica of the uplink control information symbols to be placed in some of reserved resources of the physical uplink shared channel transport blocks, and means 806 for scrambling uplink control information symbols including the symbols of the at least one layer-specific replica in a layer-specific manner for multiplexing the uplink control information with physical uplink shared channel data.

It should be appreciated that different units may be implemented as one module, unit, processor, etc, or as a combination of several modules, units, processor, etc.

It should be understood that the apparatuses may include other units or modules etc. used in or for transmission. However, they are irrelevant to the embodiments and therefore they need not to be discussed in more detail herein. Transmitting may herein mean transmitting via antennas to a radio path, carrying out preparations for physical transmissions or transmission control depending on the implementation, etc. The apparatus may utilize a transmitter and/or receiver which are not included in the apparatus itself, such as a processor, but are available to it, being operably coupled to the apparatus.

An embodiment provides a computer program embodied on a distribution medium, comprising program instructions which, when loaded into an electronic apparatus, constitute the apparatus as explained above.

Another embodiment provides a computer program embodied on a computer readable medium, configured to control a processor to perform embodiments of the method described above.

Yet another embodiment provides a computer-readable medium.

The computer program may be in source code form, object code form, or in some intermediate form, and it may be stored in some sort of carrier or a distribution medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers. The computer readable medium may be a record medium, computer memory, read-only memory and software distribution package.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
    at least one processor; and
    at least one memory including a computer program code, the at least one memory and the computer program code configured, with the at least one processor, to cause the apparatus at least to:
    reserve at least an equal number of modulation symbols for uplink control information symbols in each physical uplink shared channel transport block;
    create at least one layer-specific replica of the uplink control information symbols to be placed in some of reserved resources of the physical uplink shared channel transport blocks; and
    scramble uplink control information symbols including the symbols of the at least one layer-specific replica in a layer-specific manner for multiplexing the uplink control information with physical uplink shared channel data.

2. The apparatus of claim 1, wherein the scrambling is carried out prior to modulation and layer mapping by using a transport block-specific pseudo-random scrambling code.

3. The apparatus of claim 1, wherein the scrambling is the same for each layer.

4. The apparatus of claim 1, wherein the number of modulation symbols is determined based on a signaled modulation and coding scheme that corresponds to at least one of the uplink shared channel transport blocks or on an average number of bits per transport block.

5. The apparatus of claim 1, wherein at least an equal number of modulation symbols is reserved regardless of the modulation used for the transport block.

6. The apparatus of claim 1, wherein for a rank 3 transmission, for physical uplink shared channel transport block 2 of a total number of two physical uplink shared channel transport blocks, an even number of uplink control information symbols is reserved, and for a rank 4 transmission, for both of two physical uplink shared channel transport blocks, an even number of uplink control information symbols is reserved.

7. The apparatus of claim 1, wherein the scrambling is implemented by using phase rotation.

8. The apparatus of claim 1, wherein optimised layer-specific scrambling sequences are used.

9. The apparatus of claim 1, wherein spatial multiplexing is applied to an aperiodic channel quality indicator.

10. The apparatus of claim 1, the apparatus comprising a user device.

11. A method comprising:
    reserving at least an equal number of modulation symbols for uplink control information symbols in each physical uplink shared channel transport block;
    creating at least one layer-specific replica of the uplink control information symbols to be placed in some of reserved resources of the physical uplink shared channel transport blocks; and
    scrambling uplink control information symbols including the symbols of the at least one layer-specific replica in a layer-specific manner for multiplexing the uplink control information with physical uplink shared channel data.

12. The method of claim 11, wherein the scrambling is carried out prior to modulation and layer mapping by using a transport block-specific pseudo-random scrambling code.

13. The method of claim 11, wherein the scrambling is the same for each layer.

14. The method of claim 11, wherein the number of modulation symbols is determined based on a signaled modulation and coding scheme that corresponds to at least one of the uplink shared channel transport blocks or on an average number of bits per transport block.

15. The method of claim 11, wherein at least an equal number of modulation symbols is reserved regardless of the modulation used for the transport block.

16. The method of claim 11, wherein, for a rank 3 transmission, for physical uplink shared channel transport block 2 of a total number of two physical uplink shared channel transport blocks, an even number of uplink control information symbols is reserved, and, for a rank 4 transmission, for both of two physical uplink shared channel transport blocks, an even number of uplink control information symbols is reserved.

17. The method of claim 11, wherein the scrambling is implemented by using phase rotation.

18. The method of claim 11, wherein optimised layer-specific scrambling sequences are used.

19. The method of claim 11, wherein spatial multiplexing is applied to an aperiodic channel quality indicator.

20. An apparatus comprising:
   means for reserving at least an equal number of modulation symbols for uplink control information symbols in each physical uplink shared channel transport block;
   means for creating at least one layer-specific replica of the uplink control information symbols to be placed in some of reserved resources of the physical uplink shared channel transport blocks; and
   means for scrambling uplink control information symbols including the symbols of the at least one layer-specific replica in a layer-specific manner for multiplexing the uplink control information with physical uplink shared channel data.

21. A computer program product, comprising a non-transitory computer-readable storage medium bearing computer program code embodied therein for use with a computer, the computer program code comprising code for performing:
   reserving at least an equal number of modulation symbols for uplink control information symbols in each physical uplink shared channel transport block;
   creating at least one layer-specific replica of the uplink control information symbols to be placed in some of reserved resources of the physical uplink shared channel transport blocks; and
   scrambling uplink control information symbols including the symbols of the at least one layer-specific replica in a layer-specific manner for multiplexing the uplink control information with physical uplink shared channel data.

22. The computer program product of claim 21, wherein the scrambling is carried out prior to modulation and layer mapping by using a transport block-specific pseudo-random scrambling code.

23. The computer program product of claim 22, wherein the scrambling is the same for each layer.

24. The computer program product of claim 21, wherein the number of modulation symbols is determined based on a signaled modulation and coding scheme that corresponds to at least one of the uplink shared channel transport blocks or on an average number of bits per transport block.

25. The computer program product of claim 21, wherein at least an equal number of modulation symbols is reserved regardless of the modulation used for the transport block.

26. The computer program product of claim 21, wherein, for a rank 3 transmission, for physical uplink shared channel transport block 2 of a total number of two physical uplink shared channel transport blocks, an even number of uplink control information symbols is reserved, and, for a rank 4 transmission, for both of two physical uplink shared channel transport blocks, an even number of uplink control information symbols is reserved.

27. The computer program product of claim 21, wherein the scrambling is implemented by using phase rotation.

28. The computer program product of claim 21, wherein optimised layer-specific scrambling sequences are used.

29. The computer program product of claim 21, wherein spatial multiplexing is applied to an aperiodic channel quality indicator.

* * * * *